US006857650B2

United States Patent
Ward

(10) Patent No.: US 6,857,650 B2
(45) Date of Patent: Feb. 22, 2005

(54) TRAILER HITCH

(75) Inventor: Kenneth M. Ward, Azle, TX (US)

(73) Assignee: World Factory, Inc., Southlake, TX (US)

(*) Notice: Subject to any disclaimer, the term of this patent is extended or adjusted under 35 U.S.C. 154(b) by 0 days.

(21) Appl. No.: 10/309,482

(22) Filed: Dec. 4, 2002

(65) Prior Publication Data

US 2003/0137127 A1 Jul. 24, 2003

Related U.S. Application Data

(60) Provisional application No. 60/336,800, filed on Dec. 4, 2001.

(51) Int. Cl.[7] .................................. B62D 1/54
(52) U.S. Cl. ........................ 280/491.3; 280/515
(58) Field of Search ........................ 280/515, 491.1, 280/491.3, 416.1

(56) References Cited

U.S. PATENT DOCUMENTS 5,308,100 A * 5/1994 Heider et al. ............... 280/474
6,302,425 B1 * 10/2001 Springer .................. 280/491.3
6,460,870 B2 * 10/2002 Moss ...................... 280/491.3
6,644,680 B1 * 11/2003 Coe ............................ 280/477
2002/0105164 A1 * 8/2002 Hobdy et al. ............... 280/504

* cited by examiner

Primary Examiner—Kevin Hurley
(74) Attorney, Agent, or Firm—Hill & Hunn, LLP

(57) ABSTRACT

A dual mode trailer hitch that operates in both a "vehicle-tow" mode and a "manual tow" mode. In the vehicle-tow mode of operation, the trailer hitch is configured such that a trailer can be pivotally coupled to and towed by a towing vehicle, such as a tractor. In the manual-tow mode of operation, the trailer hitch is configured to not articulate, so that the trailer can be towed manually by a person. The trailer hitch includes bar pivot attachment member, a connecting link, a handle attachment fitting, at least one side plate, a tow bracket, and a vehicle coupling pin 23. In the preferred embodiment, the side plates are coupled on both sides of the tow bracket. The combined side plates and tow bracket are pivotally coupled to both the bar pivot attachment member and one end of the connecting link by a first pivot pin. The handle attachment fitting is pivotally coupled to the other end of connecting link by a second pivot pin. In the vehicle-tow mode, the trailer hitch is pivotally coupled to the towing vehicle by the vehicle coupling pin, which passes through apertures in the tow bracket.

2 Claims, 9 Drawing Sheets

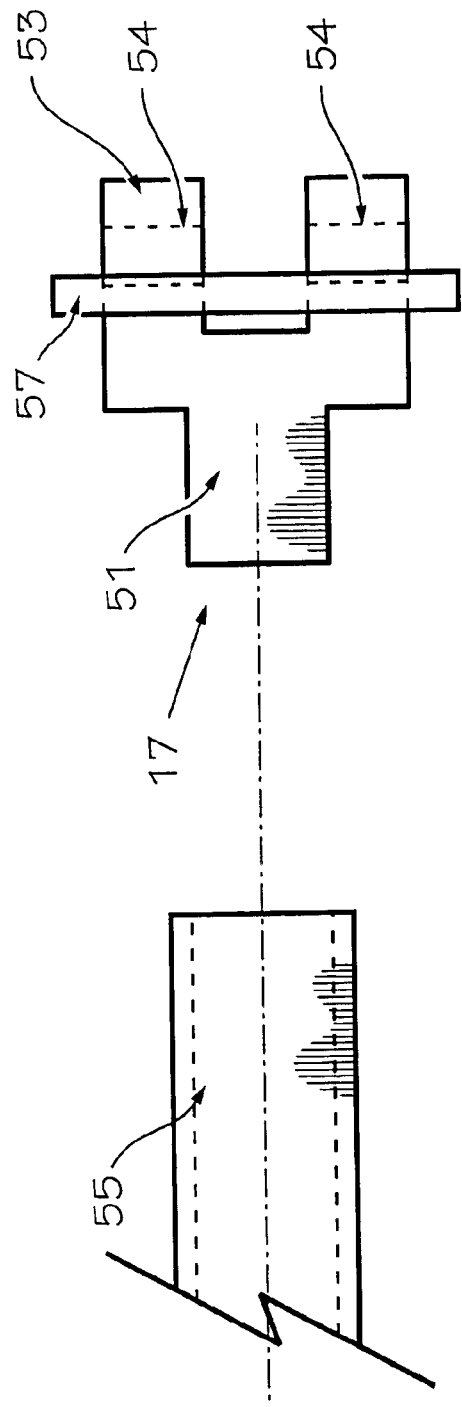
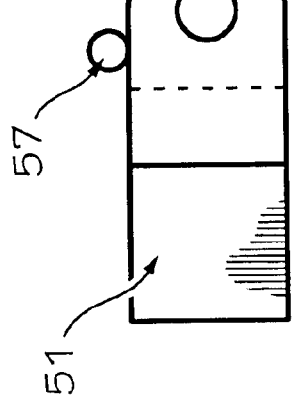
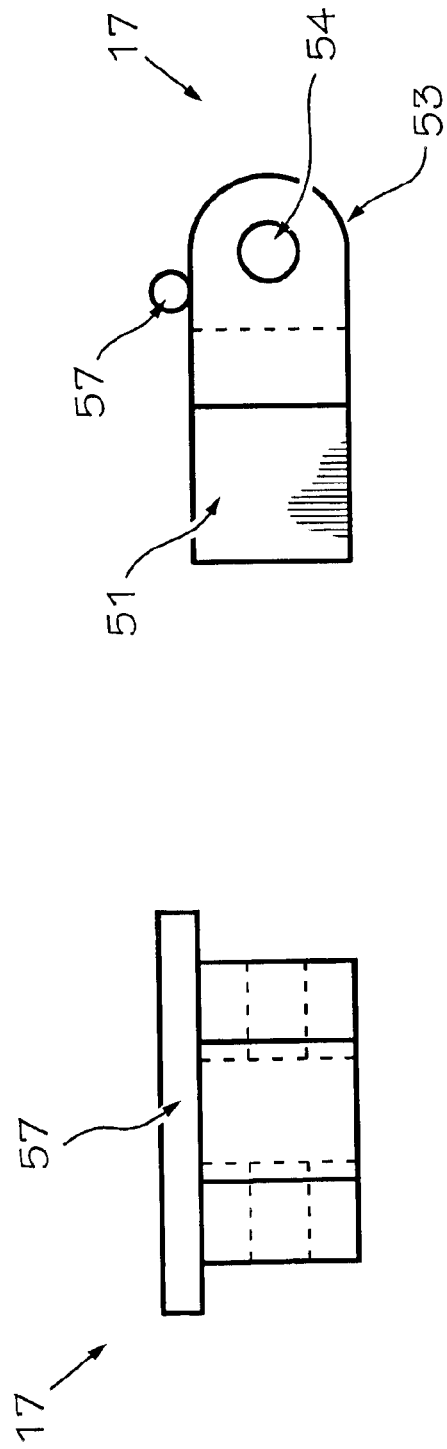
FIG. 4A
FIG. 4C
FIG. 4B

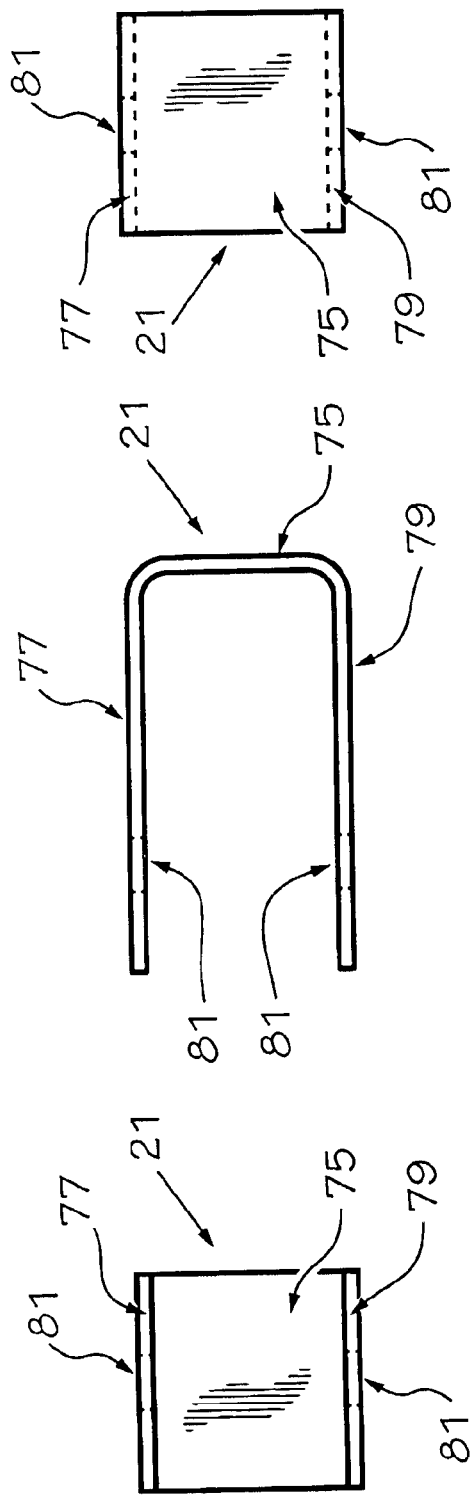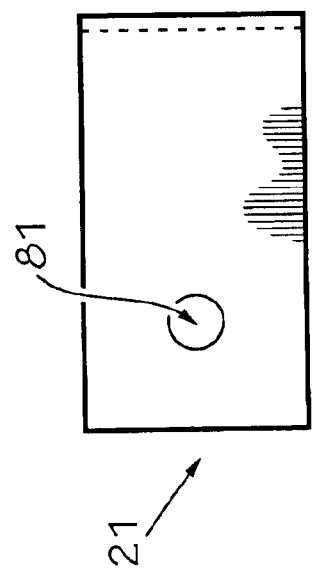

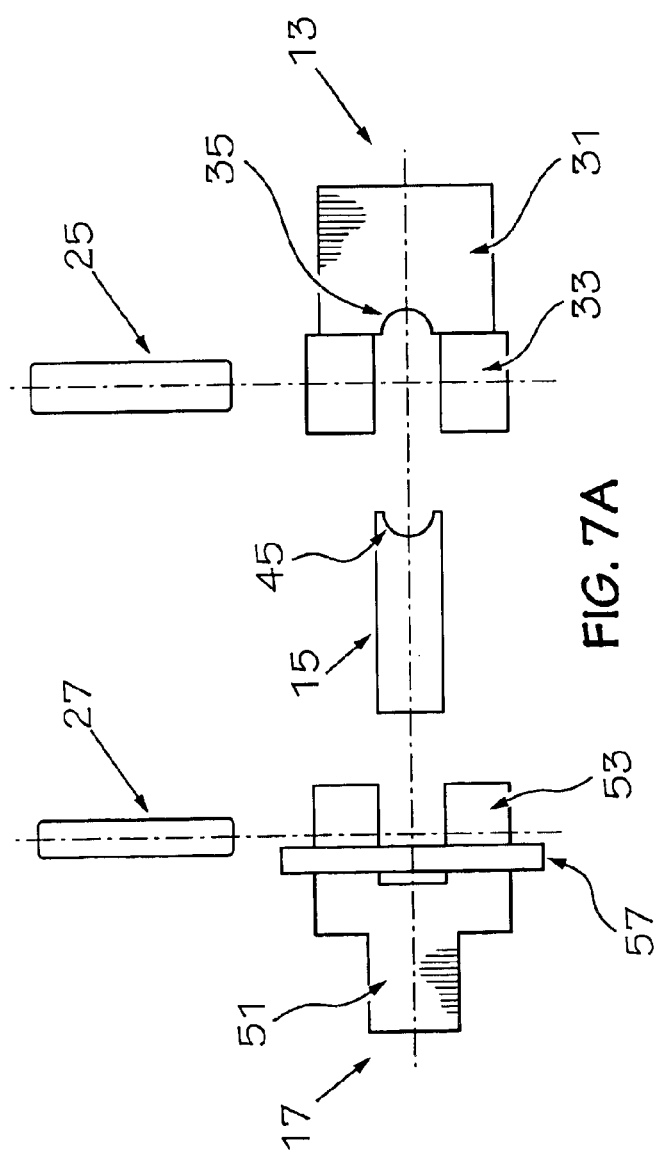
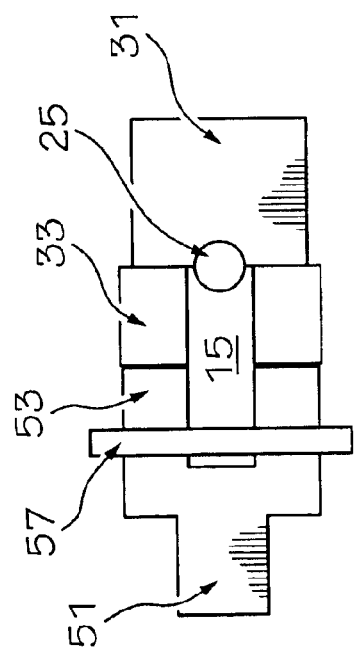
FIG. 7A
FIG. 7B

TRAILER HITCH

This application claims the benefit of U.S. Provision Application No. 60/336,800, filed Dec. 4, 2001, titled "Trailer Hitch."

BACKGROUND

1. Field of the Invention

The present invention relates to trailer hitches. In particular, the present invention relates to dual mode articulating trailer hitches.

2. Description of the Related Art

Trailer hitches have been around for hundreds of years. However, trailer hitches with interchangeable components that allow the trailer hitch to be used in both vehicle towing situations and manual towing situations, such as with small trailers and garden carts, are relatively new.

Small trailers and garden carts for residential and home use have become quite popular recently. Most such trailers and carts have either a conventional dual tab trailer hitch that allows the trailer to be towed by a vehicle, or "vehicle-tow mode;" or a pull handle that allows the trailer to be pulled manually, or "manual-tow mode." These devices typically lack a way to quickly and easily switch between the two different modes of operation.

Although there has been some development in the area of interchangeable trailer hitches, many shortcomings remain.

SUMMARY OF THE INVENTION

There is a need for a dual mode trailer hitch that can operate in either a vehicle-tow mode or a manual-tow mode, and that can quickly and easily interchange between the two modes.

Therefore, it is an object of the present invention to provide a dual mode trailer hitch that can operate in either a vehicle-tow mode or a manual-tow mode, and that can be quickly and easily interchanged between the two modes.

This object is achieved by providing a dual mode trailer hitch that operates in both a vehicle-tow mode and a manual tow mode. In the vehicle-tow mode of operation, the trailer hitch is configured such that a trailer can be pivotally coupled to and towed by a towing vehicle, such as a tractor. In the manual-tow mode of operation, the trailer hitch is configured to not articulate, so that the trailer can be towed manually by a person. The trailer hitch includes bar pivot attachment member, a connecting link, a handle attachment fitting, at least one side plate, a tow bracket, and a vehicle coupling pin 23. In the preferred embodiment, the side plates are coupled on both sides of the tow bracket. The combined side plates and tow bracket are pivotally coupled to both the bar pivot attachment member and one end of the connecting link by a first pivot pin. The handle attachment fitting is pivotally coupled to the other end of connecting link by a second pivot pin. In the vehicle-tow mode, the trailer hitch is pivotally coupled to the towing vehicle by the vehicle coupling pin, which passes through apertures in the tow bracket.

The present invention provides significant advantages over the prior art, including: (1) loss or misplacement of the various parts is not possible; (2) immediate access to pull handle and tow bracket is allowed; (3) quick and easy change over to different modes is allowed; (4) an alternate means of moving the towed device is allowed; (5) the device is designed in a manner that allows the user to convert from hand pull mode to tow mode with a minimum of difficulty and effort; (6) the device is designed to stow the handle attachment fitting 17 on the trailer bar 13 while not being used; (7) use of towed device's storage is not required, thereby maximizing available storage space; (8) alternate pull device are not mistakenly covered up by other materials placed on top of it in the storage area of towed device, thereby preventing loss; and (9) because the vehicle coupling pin 23 for attachment to the towing device is also used for locking the hand pull device, parts are minimized and user requirements are simplified.

BRIEF DESCRIPTION OF THE DRAWINGS

FIGS. 4A–4C are orthographic views of the handle attach fitting of the trailer hitch according to the present invention.

FIGS. 6A–6D are orthographic views of the tow bracket of the trailer hitch according to the present invention.

FIGS. 7A and 7B are assembly detail views of the trailer hitch according to the present invention.

DETAILED DESCRIPTION OF THE PREFERRED EMBODIMENT

Figure 1A:
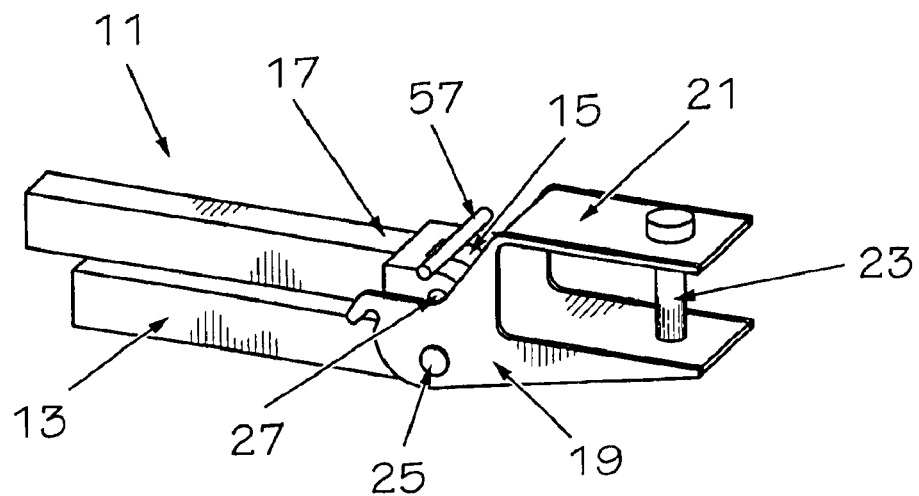
FIGS. 1A–1F are side views of the preferred embodiment of the trailer hitch according to the present invention.
Figure 1B:
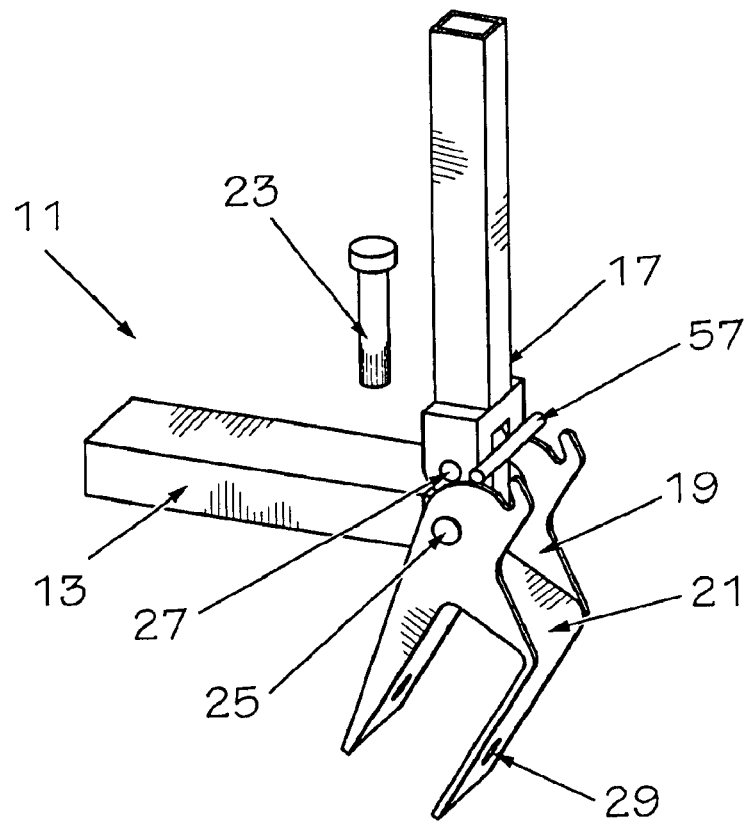
Figure 1C:
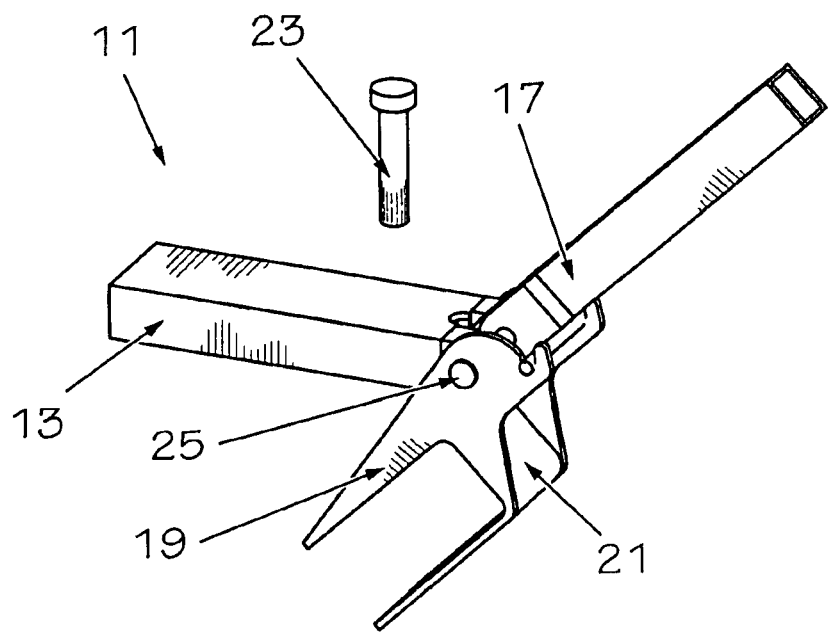
Figure 1D:
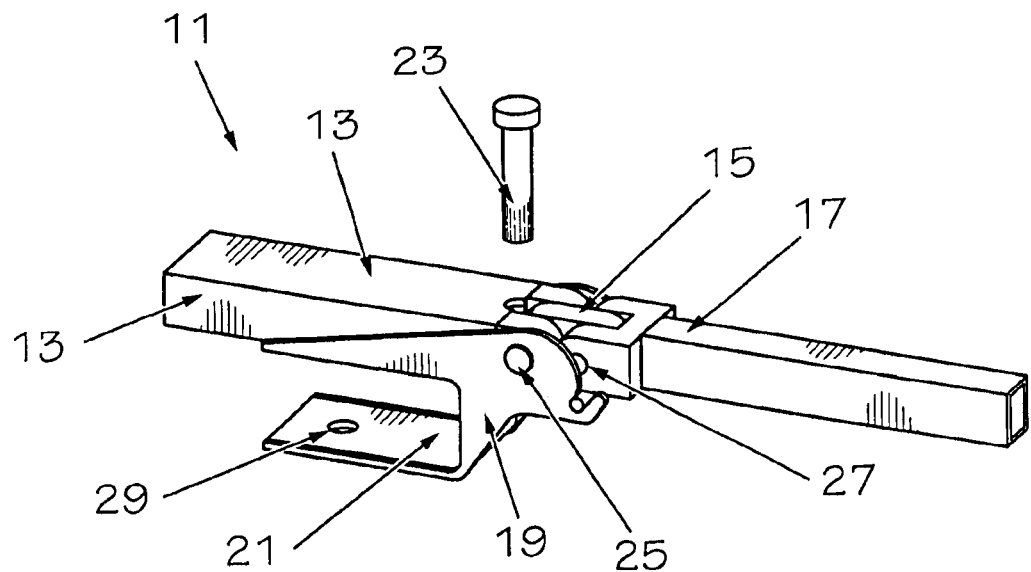
Figure 1E:
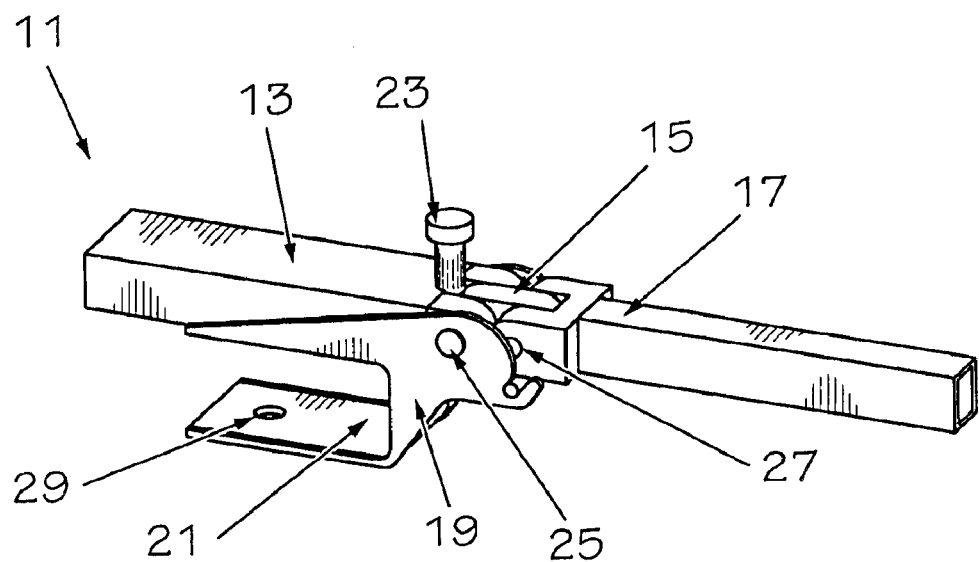
Figure 1F:
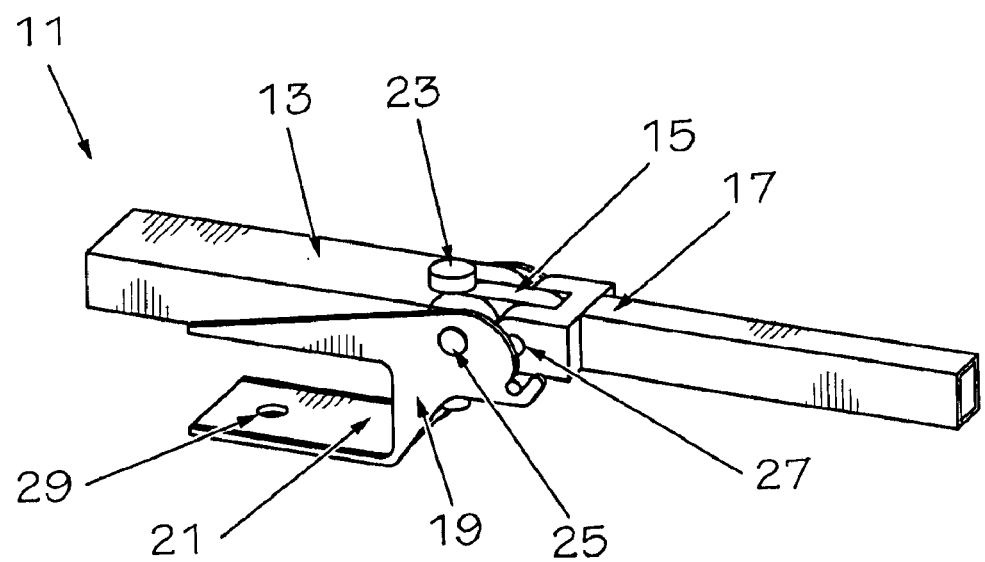

Referring now to FIGS. 1A–1F in the drawings, the preferred embodiment of a trailer hitch 11 according to the present invention is illustrated in several stages or modes of operation. In FIG. 1A, trailer hitch 11 is shown in a full "vehicle-tow" mode of operation. In the vehicle-tow mode of operation, trailer hitch 11 is configured such that a trailer, represented herein by a bar pivot attachment member 13, can be pivotally coupled to and towed by a towing vehicle, such as a tractor (not shown). In FIG. 1F, trailer hitch 11 is shown in a full "manual-tow" mode of operation. In the manual-tow mode of operation, trailer hitch 11 is configured to not articulate, such that trailer 13 can be towed manually by a person. FIGS. 1B–1E illustrate the various stages of transition of trailer hitch 11 from the vehicle-tow mode to the manual-tow mode.

Trailer hitch 11 includes bar pivot attachment member 13, a connecting link 15, a handle attachment fitting 17, at least one side plate 19, a tow bracket 21, and a vehicle coupling pin 23. In the preferred embodiment, side plates 19 are coupled on both sides of tow bracket 21. The combined side plates 19 and tow bracket 21 are pivotally coupled to both bar pivot attachment member 13 and one end of connecting link 15 by a first pivot pin 25. Handle attachment fitting 17 is pivotally coupled to the other end of connecting link 15 by a second pivot pin 27. In the vehicle-tow mode, trailer hitch 11 is pivotally coupled to the towing vehicle by vehicle coupling pin 23, which passes through apertures 29 in tow bracket 21.

Figure 2A:
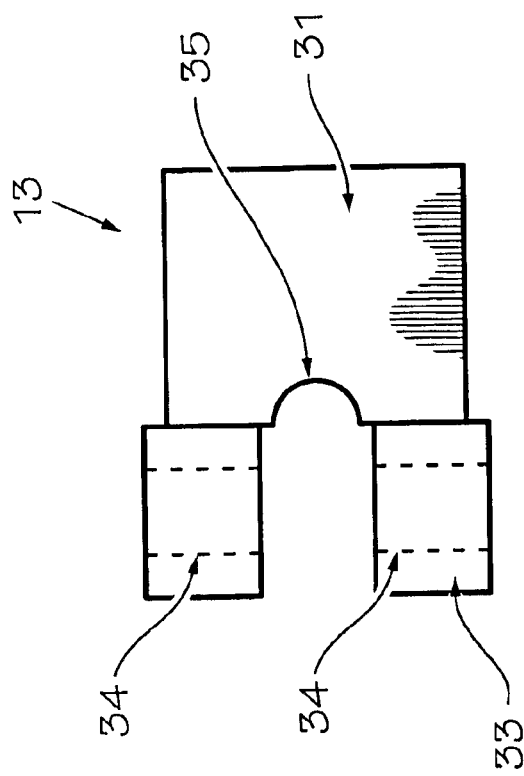
FIGS. 2A–2C are orthographic views of the bar pivot attachment of the trailer hitch according to the present invention.
Figure 2B:
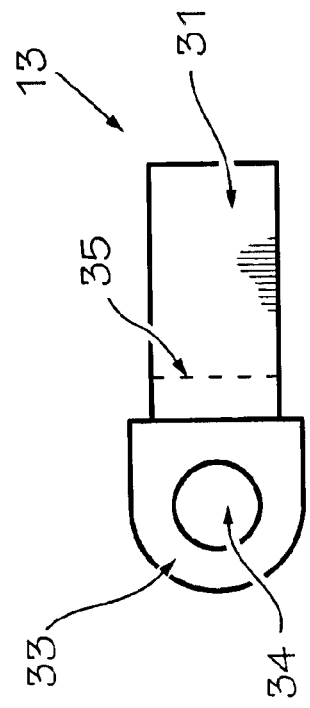
Figure 2C:
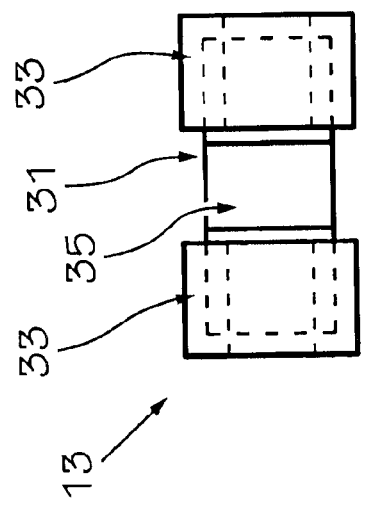

Referring now to FIGS. 2A–2C in the drawings, bar pivot attachment member 13 is illustrated in several orthographic views: a top view in FIG. 2A, a right side view in FIG. 2B, and a front view in FIG. 2C. In the preferred embodiment, bar pivot attachment member 13 would be integral with the neck portion of the trailer being towed; however, it should be understood that bar pivot attachment member may be coupled to the neck portion of an existing trailer by conventional means. Bar pivot attachment member 13 includes an elongated neck portion 31 and a clevis shaped head portion 33. Apertures 34 pass through the clevis arms of clevis shaped head portion 33. A generally semicircular notch 35 is cut away from neck portion 31 at the base of clevis shaped head 33.

Figure 3C:
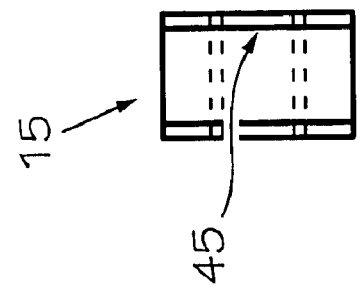
FIGS. 3A–3C are orthographic views of the connecting link of the trailer hitch according to the present invention.
Figure 3A:
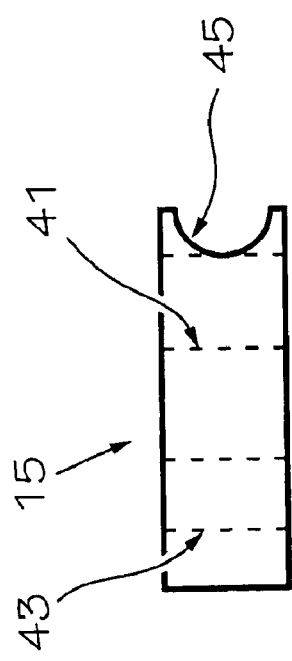
Figure 3B:
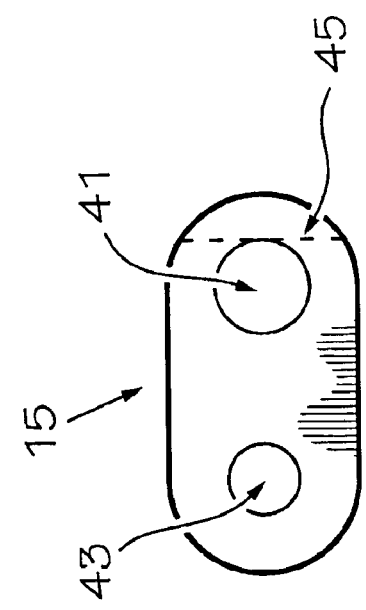

Referring now to FIGS. 3A–3C in the drawings, connecting link 15 is illustrated in several orthographic views: a top view in FIG. 3A, a right side view in FIG. 3B, and a front view in FIG. 3C. A first aperture 41 passes transversely through a first end of connecting link 15 to receive first pivot pin 25. A second aperture 43 passes transversely through a second end of connecting link 15 to receive second pivot pin 27. A vertical notch 45, preferably semicircular in shape, is cut away from the first end of connecting link 15. Notch 35 in bar pivot attachment member 13 and notch 45 in connecting link 15 combine to form a locking pin aperture for locking trailer hitch 11 in the manual-tow mode, as will be described further below. Connecting link 15 allows the combined side plates 19 and tow bracket 21 and handle attachment fitting 17 to pivot freely and independently of each other while trailer hitch 11 is in the vehicle-tow mode.

Referring now to FIGS. 4A–4C in the drawings, handle attachment fitting 17 is illustrated in several orthographic views: a top view in FIG. 4A, a front view in FIG. 4B, and a right side view in FIG. 4C. Handle attachment fitting 17 includes an elongated neck portion 51 and a clevis shaped head portion 53. Elongated neck portion 51 is configured to receive a handle or grip portion 55 which fits over and is coupled to elongated neck portion 51. In the preferred embodiment, handle or grip portion 55 is integral with elongated neck portion 51. A transverse locking pin 57 is coupled to the upper edge of clevis shaped head portion 53. Apertures 54 pass through the clevis arms of clevis shaped head portion 53.

Figure 5:
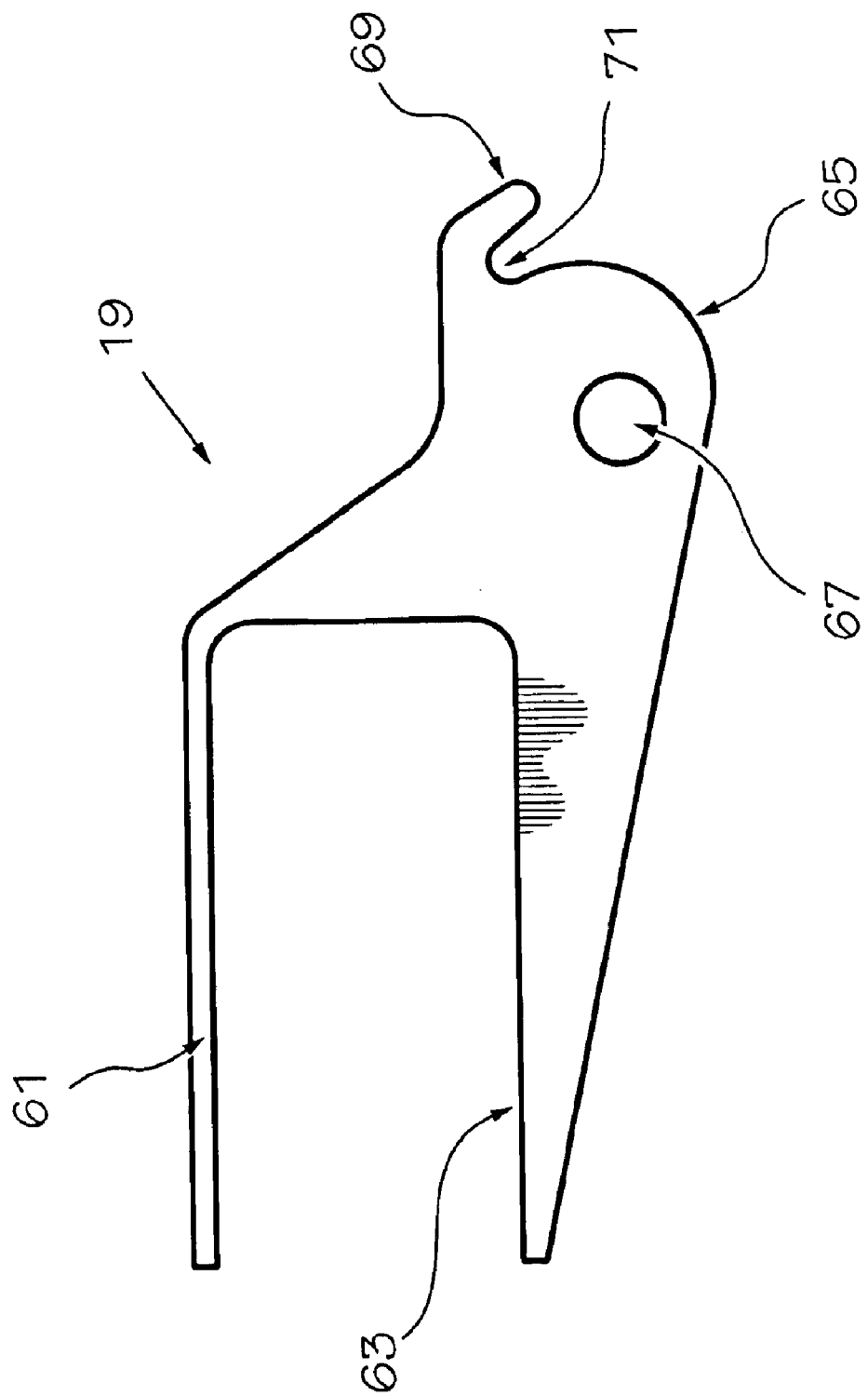
FIG. 5 is a view of the hitch side plates of the trailer hitch according to the present invention.

Referring now to FIG. 5, side plate 19 is illustrated. Side plate 19 includes an elongated upper arm 61 and a generally parallel lower arm 63, each extending outward from a base portion 65. Base portion 65 includes an aperture 67 and a dog-ear shaped portion having a tab 69 and a notch 71. Notch 71 is configured to receive locking pin 57 when trailer hitch 11 is in the manual-tow mode.

Referring now to FIGS. 6A–6D in the drawings, tow bracket 21 is illustrated in several orthographic views: a side view in FIG. 6A, a front view in FIG. 6B, a bottom/top view in FIG. 6C, and a rear view in FIG. 6D. Tow bracket 21 includes a base portion 75, a top plate 77, and bottom plate 79. Top plate 77 and bottom plate 79 are generally parallel and extend out from base portion 75. Aligned apertures 81 pass through top plate 77 and bottom plate 79. Apertures 81 are configured to receive vehicle coupling pin 23.

Referring now to FIGS. 7A and 7B in the drawings, trailer hitch 11 is shown in two simplified assembly views: unassembled in FIG. 7A, and assembled in FIG. 7B. When assembled, the first end of connection link 15 is disposed between the clevis arms of clevis shaped head portion 33 of bar pivot attachment member 13, and the second end of connection link 15 is disposed between the clevis arms of clevis shaped head portion 53 of handle attachment fitting 17.

Referring again to FIGS. 1A–1F in the drawings, the operation of trailer hitch will now be discussed. In FIG. 1A, trailer hitch 11 is shown in a the vehicle-tow mode of operation. In this mode, side plates 19 and tow bracket 21 may pivot freely in the direction of arrow A about first pivot pin 25. This allows the tow vehicle (not shown) to which trailer hitch 11 is coupled via vehicle coupling pin 29, to travel over uneven terrain without damaging the trailer or the coupling tab attached to the tow vehicle. A clip or other fastener may be included to prevent unwanted movement of handle attachment fitting while trailer hitch 11 is in the vehicle-tow mode.

To transition trailer hitch 11 from the vehicle-tow mode to the manual-tow mode, trailer hitch 11 is decoupled form the tow vehicle and handle attachment fitting is rotated up in the direction of arrow B in FIG. 1B. As is shown, side plates 19 and two bracket 19 freely swing underneath trailer bar 13. During the initial rotation of handle attachment fitting 17, tab portions 69 of side plates clear locking pin 57 of handle attachment fitting 17. However, once handle attachment fitting 17 reaches a selected position, such as the position of FIG. 1C, locking pin 57 engages notches 71 of side plates 19. This causes handle attachment fitting 17, connecting link 15, and side plates 19 to form a rigid body. This two-point attachment configuration of handle attachment fitting 17, connecting link 15, and bar pivot attachment member 13 allows this selected engagement of locking pin 57 in notches 71.

Once handle attachment fitting 17 has been fully rotated, vehicle coupling pin is inserted through the aperture formed by notches 35 and 45, thereby locking trailer hitch 11 in the manual-tow mode. Once in the manual-tow mode, the trailer can be moved by a person pulling on the handle or grip portion 55.

It should be understood that vehicle coupling pin 23 may be secured to trailer hitch 11 by a chain, cable, or any other conventional means so that it does not get misplaced.

The main features of the hitch are as follows: The tow bracket and the hand pull device are incorporated into a single assembly, non-removable unit. A lanyard to the tow hitch assembly permanently attaches the pin and locking clip.

Benefits of the present invention include: (1) loss or misplacement of the various parts is not possible; (2) immediate access to pull handle and tow bracket is allowed; (3) quick and easy change over to different modes is allowed; (4) an alternate means of moving the towed device is allowed; (5) the device is designed in a manner that allows the user to convert from hand pull mode to tow mode with a minimum of difficulty and effort; (6) the device is designed to stow the handle attachment fitting 17 on the trailer bar 13 while not being used; (7) use of towed device's storage is not required, thereby maximizing available storage space; (8) alternate pull device are not mistakenly covered up by other materials placed on top of it in the storage area of towed device, thereby preventing loss; and (9) because the vehicle coupling pin 23 for attachment to the towing device is also used for locking the hand pull device, parts are minimized and user requirements are simplified.

It is apparent that an invention with significant advantages has been described and illustrated. Although the present invention is shown in a limited number of forms, it is not limited to just these forms, but is amenable to various changes and modifications without departing from the spirit thereof.

I claim:

1. A trailer hitch comprising:
   a connecting link having a first pivot point and a second pivot point;
   a bar pivot attachment member pivotally connected to the first pivot point;

a tow bracket also pivotally coupled to the first pivot point; and a handle attachment fitting pivotally coupled to the second pivot point;

wherein the trailer hitch is operable between:

a vehicle-tow mode in which the handle attachment fitting is disposed in a stowed position and the tow bracket is pivotally operable relative to the bar pivot attachment member; and a manual-tow mode in which the tow bracket is disposed in a stowed position and the handle attachment fitting is rigidly operable relative to the bar pivot attachment member.

2. The trailer hitch according to claim 1, further comprising:

an aperture formed by the bar pivot attachment member and the handle attachment fitting when the trailer hitch is in the manual tow mode;

a locking pin;

wherein the handle attachment fitting is held rigid relative to the bar pivot attachment member when the locking pin is disposed through the aperture.

* * * * *